US011268761B2

(12) United States Patent
Chen

(10) Patent No.: US 11,268,761 B2
(45) Date of Patent: Mar. 8, 2022

(54) HORIZONTAL PYROLYSIS FURNACE

(71) Applicants:JING LEEI ENTERPRISE CO., LTD., Kaohsiung (TW); Hsuan-Jung Chen, Yunlin County (TW)

(72) Inventor: Hsuan-Jung Chen, Yunlin County (TW)

(73) Assignees: Jing Leei Enterprise Co., Ltd., Kaohsiung (TW); Hsuan-Jung Chen, Yunlin County (TW)

( * ) Notice: Subject to any disclaimer, the term of this patent is extended or adjusted under 35 U.S.C. 154(b) by 30 days.

(21) Appl. No.: 16/907,725

(22) Filed: Jun. 22, 2020

(65) Prior Publication Data

US 2021/0396470 A1 Dec. 23, 2021

(51) Int. Cl.
*C10B 1/06* (2006.01)
*F27B 7/02* (2006.01)
*F27B 7/30* (2006.01)
*F27B 7/32* (2006.01)
*F27B 7/20* (2006.01)
(Continued)

(52) U.S. Cl.
CPC .................. *F27B 7/02* (2013.01); *B01J 6/008* (2013.01); *C01B 3/02* (2013.01); *C10B 1/10* (2013.01); *C10B 5/00* (2013.01); *C10B 7/02* (2013.01); *C10B 47/30* (2013.01); *C10B 47/36* (2013.01); *C10B 53/00* (2013.01); *F23G 5/20* (2013.01); *F27B 7/08* (2013.01); *F27B 7/161* (2013.01); *F27B 7/2075* (2013.01); *F27B 7/30* (2013.01); *F27B 7/3205* (2013.01); *F27B 7/33* (2013.01); *F23G 2900/50201* (2013.01); *F27B 2007/022* (2013.01); *F27B 2007/025* (2013.01); *F27B 2007/027* (2013.01); *F27B 2007/165* (2013.01); *F27B 2007/2246* (2013.01); *F27B 2009/384* (2013.01)

(58) Field of Classification Search
CPC ........... C10B 47/30; C10B 47/36; C10B 1/06; C10B 1/10; C10B 57/02
See application file for complete search history.

(56) References Cited

U.S. PATENT DOCUMENTS

| 25,109 A | * | 8/1859 | Gengembre | ............... C10B 1/10 201/33 |
| 4,193,756 A | * | 3/1980 | Leon | ......................... F27B 7/24 432/3 |

(Continued)

FOREIGN PATENT DOCUMENTS

| CN | 206545002 U | 10/2017 |
| CN | 108384564 A | 8/2018 |
| TW | M600754 U | 9/2020 |

*Primary Examiner* — Jonathan Luke Pilcher
(74) *Attorney, Agent, or Firm* — Rosenberg, Klein & Lee

(57) ABSTRACT

A horizontal pyrolysis furnace has a kiln and two barrels. The two barrels are respectively a processing barrel rotatably disposed in the kiln and a takeover barrel detachably connected with the processing barrel. Each one of the two barrels has a gate assembly and at least one spiral guiding plate. The gate assembly of the processing barrel is mounted on an end of the processing barrel, and extends out from the kiln. The two gate assemblies of the two barrels are detachably connected such that the two barrels are able to rotate synchronously. The at least one spiral guiding plate is fixed on an inner surface of one of the two barrels, and the spiral guiding plates of both barrels have an identical helical direction.

12 Claims, 4 Drawing Sheets

(51) Int. Cl.
*F27B 7/08*     (2006.01)
*F27B 7/33*     (2006.01)
*F23G 5/20*     (2006.01)
*B01J 6/00*     (2006.01)
*C01B 3/02*     (2006.01)
*C10B 53/00*    (2006.01)
*C10B 47/36*    (2006.01)
*C10B 7/02*     (2006.01)
*C10B 5/00*     (2006.01)
*C10B 47/30*    (2006.01)
*F27B 7/16*     (2006.01)
*C10B 1/10*     (2006.01)
*F27B 9/38*     (2006.01)
*F27B 7/22*     (2006.01)

(56) References Cited

U.S. PATENT DOCUMENTS

| | | | | |
|---|---|---|---|---|
| 4,361,333 | A * | 11/1982 | Firth | F27B 7/24 |
| | | | | 202/222 |
| 10,465,119 | B2 * | 11/2019 | Endou | F27B 7/26 |
| 2016/0264872 | A1 * | 9/2016 | Endou | F27B 7/42 |
| 2018/0079979 | A1 * | 3/2018 | Donegan | C10J 3/721 |

\* cited by examiner

HORIZONTAL PYROLYSIS FURNACE

BACKGROUND OF THE INVENTION

1. Field of the Invention

The present invention relates to a pyrolysis furnace, and more particularly to a horizontal pyrolysis furnace.

2. Description of Related Art

Pyrolysis is thermal decomposition of organic materials occurring without oxygen at elevated temperatures in a closed chamber. Industrial waste such as plastic trash may be converted into reusable resources, e.g. synthesis gas, via pyrolysis process.

A conventional pyrolysis furnace includes a kiln and a processing container. The processing container is disposed in the kiln, so pyrolysis of the industrial waste in the processing container may take place as the processing container is heated by the kiln.

However, the conventional pyrolysis furnace has the following shortcomings.

1. During the pyrolysis, smokes and toxic gases such as dioxins are produced. These pollutants may expand through the working environment when an operator opens the processing container.

2. On the other hand, after the pyrolysis process is finished, the operator should await initial cooling before taking out solid products such as charcoal from the processing container of the conventional pyrolysis furnace. Nonetheless, the processing container has to be heated again after cooling for the next operation. So the conventional pyrolysis furnace causes unnecessary thermal energy loss.

SUMMARY OF THE INVENTION

The main objective of the present invention is to provide a horizontal pyrolysis furnace which is able to solve the problems of pollution and energy inefficiency.

The horizontal pyrolysis furnace has a kiln and two barrels. The two barrels respectively include a processing barrel rotatably disposed in the kiln and a takeover barrel detachably connected with the processing barrel. Each one of the two barrels has a gate assembly and at least one spiral guiding plate. The gate assembly of the processing barrel is mounted on an end of the processing barrel, and extends out from the kiln. The two gate assemblies of the two barrels are detachably connected such that the two barrels are able to rotate synchronously. The at least one spiral guiding plate is fixed on an inner surface of one of the two barrels, and the spiral guiding plates of both barrels have an identical helical direction.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
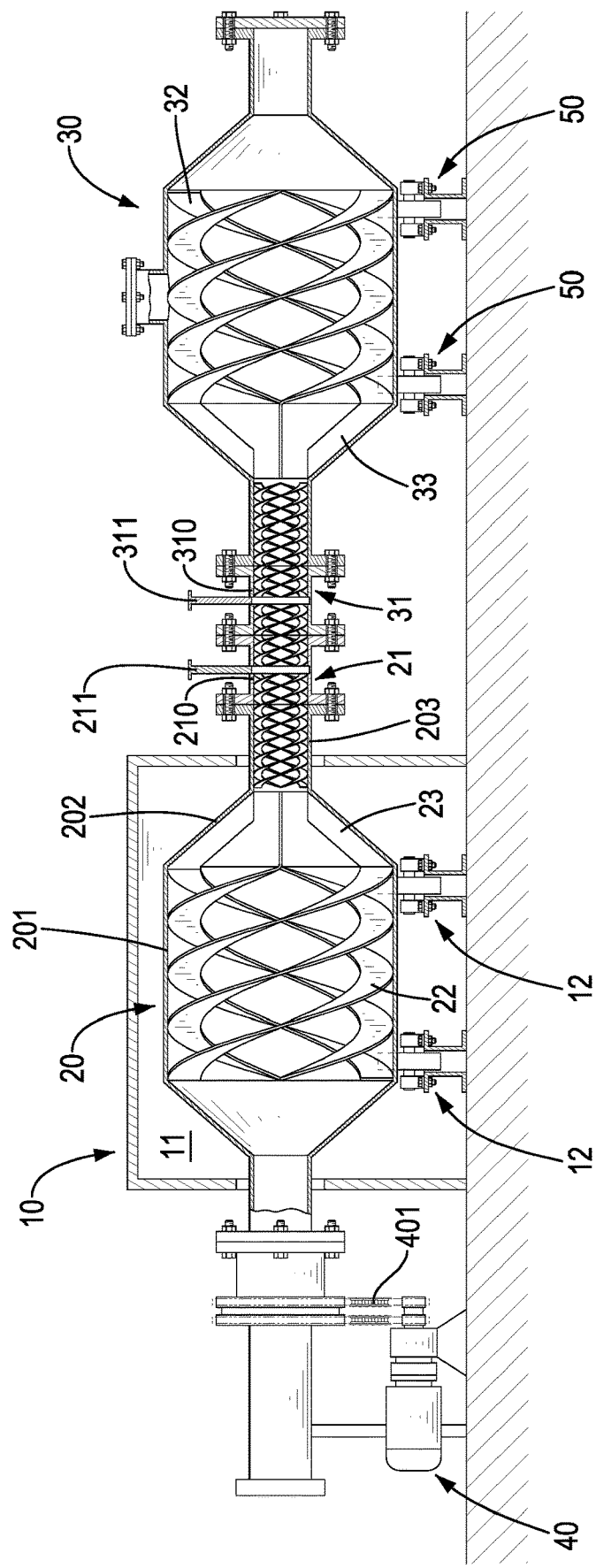
FIG. 1 is a side view in partial section of a first embodiment of a horizontal pyrolysis furnace in accordance with the present invention.
Figure 2:
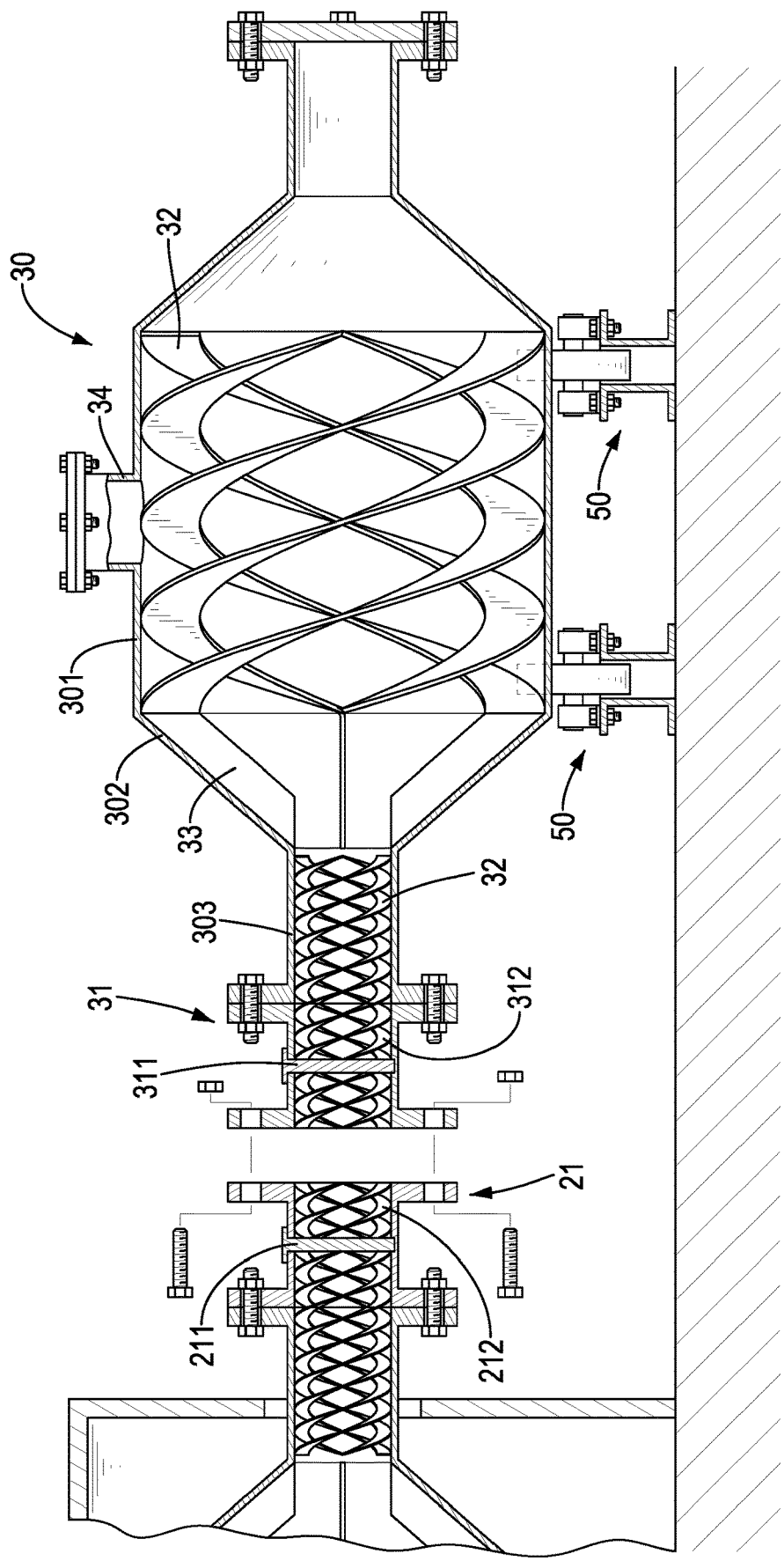
FIG. 2 is an enlarged exploded side view in partial section of the horizontal pyrolysis furnace in FIG. 1.
Figure 3:
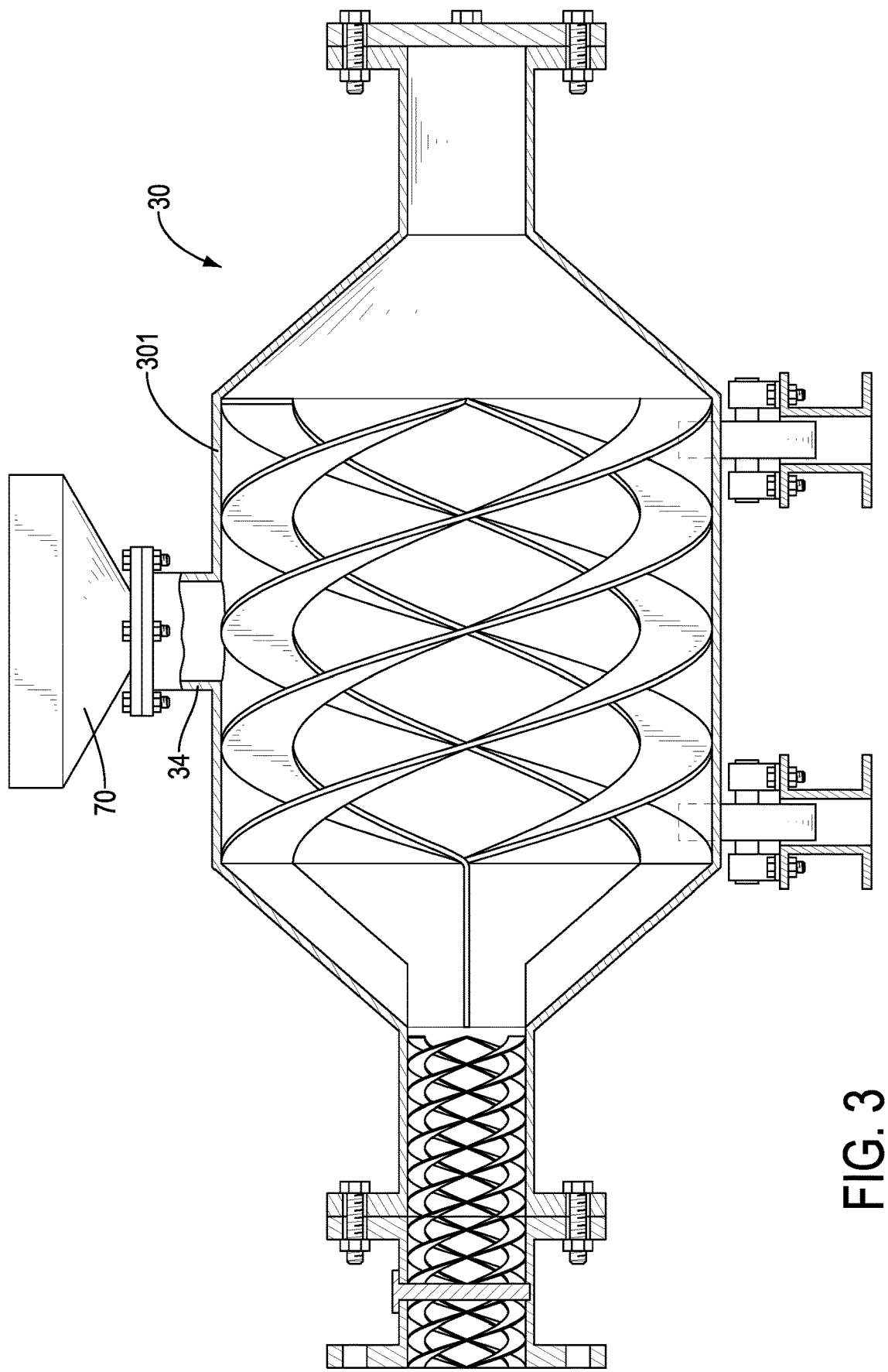
FIG. 3 is an operational side view in partial section of the horizontal pyrolysis furnace in FIG. 1.

With reference to FIGS. 1 to 3, a first embodiment of a horizontal pyrolysis furnace in accordance with the present invention comprises a kiln 10 and two barrels 20, 30, namely a processing barrel 20 and a takeover barrel 30, respectively.

The kiln 10 has a heating chamber 11 and two roller assemblies 12. With reference to FIG. 1, the heating chamber 11 is disposed inside the kiln 10. The two roller assemblies 12 are disposed at a spaced interval at a bottom of the heating chamber 11.

The processing barrel 20 is rotatably disposed in the kiln 10. At least one of two ends of the processing barrel 20 extends outside the kiln 10. The takeover barrel 30 is disposed at a spaced interval from the kiln 10, and is connected to the processing barrel 20. Thus the takeover barrel 30 rotates synchronously with the processing barrel 20. If both of the two ends of the processing barrel 20 extend out from the kiln 10, the takeover barrel 30 may be connected to either one of the two ends of the processing barrel 20. If only one of the two ends of the processing barrel 20 extends out from the kiln 10, then that end is connected with the takeover barrel 30. Each one of the two barrels 20, 30 has a gate assembly 21, 31 and at least one spiral guiding plate 22, 32. The gate assembly 21 of the processing barrel 20 is mounted on one of the two ends of the processing barrel 20, where the end and the gate assembly 21 extend out from the kiln 10. The two gate assemblies 21, 31 of the two barrels 20, 30 are detachably connected, so the two barrels 20, 30 may rotate in an identical angular velocity.

Each one of the two gate assemblies 21, 31 has a tube body 210, 310 and a gate 211, 311. The tube body 210, 310 communicates with an inner space of the barrel 20, 30. The gate 211, 311 slides transversely in the tube body 210, 310, and stops two spaces beside the gate 211, 311 from communicating to each other.

The at least one spiral guiding plate 22, 32 is fixed on an inner surface of one of the two barrels 20, 30. The spiral guiding plates 22, 32 of both of the two barrels 20, 30 have the same helical direction. That is, the spiral guiding plates 22, 32 are all left-handed or all right-handed.

In the first embodiment of the present invention, the processing barrel 20 is disposed on the two roller assemblies 12. Further both ends of the processing barrel 20 extend out of the kiln 10. The end of the processing barrel 20 located away from the gate assembly 21 is connected with a driving assembly 40. The driving assembly 40 rotates the processing barrel 20 with at least one chain 401. Moreover, the horizontal pyrolysis furnace comprises two outer roller assemblies 50 which are disposed separately on the ground from the kiln 10 and aligned with the kiln 10. The takeover barrel 30 is rotatably disposed on the two outer roller assemblies 50.

With reference to FIGS. 1 and 2, each one of the processing barrel 20 and the takeover barrel 30 includes a containing section 201, 301, a tapering section 202, 302, and a linking section 203, 303. An inner diameter of the containing section 201, 301 is larger than that of the linking section 203, 303, and the tapering section 202, 302 is connected between the containing section 201, 301 and the linking section 203, 303. Each barrel 20, 30 further has multiple said spiral guiding plates 22, 32 and multiple guiding flat plates 23, 33. The multiple spiral guiding plates 22, 32 are respectively fixed on one of inner surfaces of the containing section 201, 301 and the linking section 203, 303. In the first embodiment, each of the containing section 201, 301 and the linking section 203, 303 has four spiral guiding plates 22, 32 fixed thereto. The four spiral guiding plates 22, 32 form a quadruple helix. The multiple guiding flat plates 23, 33 are separately fixed on an inner surface of the tapering section 202, 302.

Furthermore, with reference to FIG. 2, each one of the gate assemblies 21, 31 comprises multiple spiral plates 212, 312 fixed to an inner surface of the tube body 210, 310 of the gate assembly 21, 31. The multiple spiral plates 212, 312 have the same helical direction with the multiple spiral guiding plates 22, 32.

With aforesaid technical characteristics, an operator may fill the takeover barrel 30 with industrial waste. Afterward he may make the gates 211, 311 of the gate assemblies 21, 31 of the two barrels 20, 30 opened when the two gate assemblies 21, 31 are connected. The driving assembly 40 may then be used to rotate the two barrels 20, 30. The industrial waste may be transferred to the containing section 201 of the processing barrel 20 via the tube bodies 210, 310 of the two gate assemblies 21, 31 as the multiple spiral guiding plates 22, 32 and the multiple spiral plates 212, 312 rotate. The operator may close the two gates 211, 311, and activates the kiln 10 for heating for pyrolysis. After pyrolysis is finished, solid products may be transferred back to the containing section 301 of the takeover barrel 30 in a reverse rotation driven by the driving assembly 40 (with the two gates 211, 311 reopened). The operator may then close the two gates 211, 311 once again, and separates the two barrels 20, 30 by detaching the two gate assemblies 21, 31. Thus, the takeover barrel 30 may be set aside for cooling and further processing. For example, the smokes and toxic gases in the takeover barrel 30 may be exhausted with an outer device.

At the same time, another pre-filled takeover barrel 30 may be utilized and connected with the processing barrel 20 for further another round of pyrolysis. In this way, continuous pyrolysis can be processed again and again efficiently before a temperature of the processing barrel 20 goes down. Therefore, two or more takeover barrels 30 are preferred.

With reference to FIGS. 2 and 3, the takeover barrel 30 further comprises a feeding opening 34 disposed through the containing section 301 of the takeover barrel 30. Before the two barrels 20, 30 get connected, the feeding opening 34 is connected to a feeder 70 so that the containing section 301 may be filled with industrial waste. After filling, the feeding opening 34 of the takeover barrel 30 is separated from the feeder 70, and the gate assembly 31 of the takeover barrel 30 is connected to the processing barrel 20 for transferring the industrial waste. With reference to FIG. 2, during the transfer of the industrial waste, the feeding opening 34 is blocked with a board so as to prevent the industrial waste from falling off.

Figure 4:
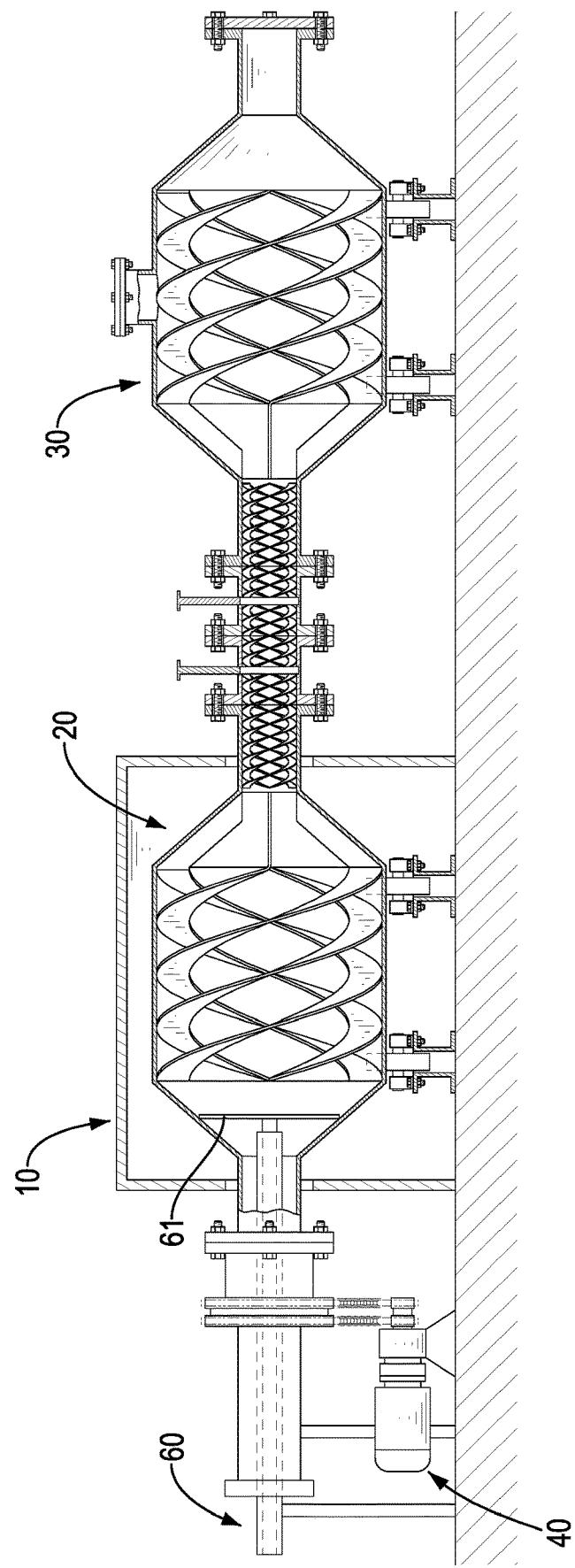
FIG. 4 is a side view in partial section of a second embodiment of the horizontal pyrolysis furnace in accordance with the present invention.

With reference to FIG. 4, a second embodiment of the present invention differs from the first embodiment in that the horizontal pyrolysis furnace comprises an exhaust tube 60 extending into the processing barrel 20 from the end away from the gate assembly 21. The exhaust tube 60 is used to exhaust the smokes and toxic gases. Nonetheless, the exhaust tube 60 has a scraper 61. The scraper 61 is assembled on the exhaust tube 60, and extends near the inner surface of the processing barrel 20. When char is stuck on the inner surface of the processing barrel 20, the char may be scraped away by the scraper 61 during the rotation of the processing barrel 20 due to thickness of the char. In the second embodiment of the present invention, the processing barrel 20 is large enough for the operator to enter, and the operator may then assemble the scraper 61 on the exhaust tube 60 therein.

With the aforementioned technical characteristics, the horizontal pyrolysis furnace in accordance with the present invention has the following advantages.

1. The two barrels 20, 30 are detachable. Therefore the processing barrel 20 may be used for continuous pyrolysis without unnecessary cooling. The takeover barrel 30 is used for other processes except pyrolysis, such as filling, cooling, exhausting, etc. Working efficiency and thermal efficiency are thereby improved.

2. The pollutant problem of the prior art is solved due to the exhaust tube 60.

3. Char produced on the inner surface of the processing barrel 20 may be cleaned automatically by the scraper 61 as the processing barrel 20 rotates.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A horizontal pyrolysis furnace comprising:
   a kiln; and
   two barrels being respectively a processing barrel rotatably disposed in the kiln and a takeover barrel detachably connected with the processing barrel; wherein
   each one of the two barrels comprises a gate assembly and at least one spiral guiding plate;
   the gate assembly of the processing barrel is mounted on one of two ends of the processing barrel, and said end and the gate assembly of the processing barrel extends out from the kiln;
   the gate assembly of each one of the two barrels is detachably connected to each other, wherein the two barrels rotate synchronously when the two barrels are connected to each other via the gate assembly of each one of the two barrels;
   the at least one spiral guiding plate is fixed on an inner surface of one of the two barrels, and the spiral guiding plates of the two barrels have an identical helical direction; and
   the gate assembly of each one of the two barrels comprises
     a tube body communicating with an inner space of the respective barrel to which the gate assembly comprising the tube body belongs; and
     a gate transversely sliding in the tube body, wherein the gate prevents communication between two spaces beside the gate when the gate is at a closed position.

2. The horizontal pyrolysis furnace as claimed in claim 1, wherein
   each one of the two barrels further comprises a containing section, a tapering section, and a linking section sequentially connected and communicating with one another, an inner diameter of the containing section is larger than an inner diameter of the linking section, and the tapering section is connected between the containing section and the linking section; and each one of the barrels further comprises
a plurality of spiral guiding plates respectively positioned on an inner surface of either one of the containing section or the linking section; and
multiple guiding flat plates separately fixed on an inner surface of the tapering section.

3. The horizontal pyrolysis furnace as claimed in claim 1, wherein each one of the gate assemblies further comprises multiple spiral plates fixed to an inner surface of the tube body of the gate assembly, and having the same helical direction as the spiral guiding plates.

4. The horizontal pyrolysis furnace as claimed in claim 2, wherein each one of the gate assemblies further comprises multiple spiral plates fixed to an inner surface of the tube body of the gate assembly, and having the same helical direction as the spiral guiding plates.

5. The horizontal pyrolysis furnace as claimed in claim 1, wherein the kiln comprises
a heating chamber disposed inside the kiln; and
two roller assemblies disposed at a spaced interval at a bottom of the heating chamber, wherein the processing barrel is positioned to rotate on the two roller assemblies.

6. The horizontal pyrolysis furnace as claimed in claim 2, wherein the kiln comprises
a heating chamber disposed inside the kiln; and
two roller assemblies disposed at a spaced interval at a bottom of the heating chamber, wherein the processing barrel is positioned to rotate on the two roller assemblies.

7. The horizontal pyrolysis furnace as claimed in claim 5, wherein the horizontal pyrolysis furnace further comprises two outer roller assemblies disposed separately from the kiln and configured for supporting the takeover barrel to rotate synchronously with the processing barrel thereon.

8. The horizontal pyrolysis furnace as claimed in claim 6, wherein the horizontal pyrolysis furnace further comprises two outer roller assemblies disposed separately from the kiln and configured for supporting the takeover barrel to rotate synchronously with the processing barrel thereon.

9. The horizontal pyrolysis furnace as claimed in claim 2, wherein the takeover barrel further comprises a feeding opening disposed through the containing section of the takeover barrel.

10. The horizontal pyrolysis furnace as claimed in claim 1, wherein
both of the two ends of the processing barrel extend out from the kiln; and
the horizontal pyrolysis furnace further comprises an exhaust tube extending into the processing barrel from the other end of the processing barrel devoid of the gate assembly, and
a scraper assembled on the exhaust tube, and extending near the inner surface of the processing barrel.

11. The horizontal pyrolysis furnace as claimed in claim 1, wherein the horizontal pyrolysis furnace further comprises a plurality of said takeover barrels, and one of the plurality of takeover barrels is connected to the gate assembly of the processing barrel via the gate assembly of said one of the plurality of takeover barrels.

12. The horizontal pyrolysis furnace as claimed in claim 2, wherein the horizontal pyrolysis furnace further comprises a plurality of said takeover barrels, and one of the plurality of takeover barrels is connected to the gate assembly of the processing barrel via the gate assembly of said one of the plurality of takeover barrels.

* * * * *